Sept. 25, 1956 B. DIENER 2,764,343

ELECTRONIC SWITCHING AND COUNTING CIRCUIT

Filed Feb. 25, 1952 6 Sheets-Sheet 1

INTERPULSE INTERVALS

INVENTOR.
BERNARD DIENER,
BY Nicholas T Volk
ATTORNEY.

Sept. 25, 1956 B. DIENER 2,764,343

ELECTRONIC SWITCHING AND COUNTING CIRCUIT

Filed Feb. 25, 1952 6 Sheets-Sheet 2

INVENTOR.
BERNARD DIENER
BY Nicholas T Volk
ATTORNEY.

Sept. 25, 1956 B. DIENER 2,764,343

ELECTRONIC SWITCHING AND COUNTING CIRCUIT

Filed Feb. 25, 1952 6 Sheets-Sheet 3

INVENTOR.
BERNARD DIENER,
BY Nicholas T Volk
ATTORNEY.

ELECTRONIC SWITCHING AND COUNTING CIRCUIT

Filed Feb. 25, 1952 6 Sheets-Sheet 4

INVENTOR.
BERNARD DIENER,
BY Nicholas T Volk
ATTORNEY

Sept. 25, 1956 B. DIENER 2,764,343

ELECTRONIC SWITCHING AND COUNTING CIRCUIT

Filed Feb. 25, 1952 6 Sheets-Sheet 5

INVENTOR.
BERNARD DIENER,
BY
Nicholas T Volk
ATTORNEY.

ELECTRONIC SWITCHING AND COUNTING CIRCUIT

Filed Feb. 25, 1952 6 Sheets-Sheet 6

INVENTOR.
BERNARD DIENER,
BY Nicholas T Volk
ATTORNEY.

United States Patent Office 2,764,343
Patented Sept. 25, 1956

2,764,343

ELECTRONIC SWITCHING AND COUNTING CIRCUIT

Bernard Diener, Culver City, Calif., assignor, by mesne assignments, to Hughes Aircraft Company, a corporation of Delaware Application February 25, 1952, Serial No. 273,271
20 Claims. (Cl. 235—61)

This invention relates to an electronic switching and counting circuit and, more particularly, to an electronic switching and counting circuit operable on a time-sharing basis as either a shifting register, a high speed counter, a waveform generator, a parallel-set register or a digital-to-analog converter.

Modern high speed digital computers are extremely complex mechanisms owing to the relatively large number of functions which they must perform in even the most simple of mathematical computations. Thus, a single computer will have a great many individual circuits, with each circuit performing a different and distinct function in the computation process. However, it is seldom that more than a few of the circuits involved operate simultaneously owing to the inherent step by step operations employed in the usual binary computations. Accordingly, a given circuit may be called upon to function during a specified time interval and then lie idle while the remaining circuits in the computer are sequentially called upon to continue the operation thus initiated. In this way, each of a large number of circuits operates only occasionally and then in specified time relationship to the other circuits.

The switching and counting circuit of the present invention contributes to a reduction of the complexity inherent in the prior art binary computers by being capable of performing a multitude of operations on a time-sharing basis. In particular, the switching and counting circuit of the present invention may function either as a shifting register, a high-speed counter, a stepped waveform signal generator, a parallel-set register, or a digital-to-analog converter, as determined by interrelated input switching and gating devices. Thus, the circuit may perform any of the above-noted functions while, at the same time, being only of a slightly greater complexity than a conventional circuit capable of producing any one of the given functions.

Owing to the many operations capable of being performed by the device according to the present invention, the number of circuits employed, as well as the overall weight, size, number of components, and power drain, of existing computer systems may be appreciably reduced. Also, the servicing thereof is rendered much simpler and the reliability of the computer is increased.

The switching and counting circuit of the present invention, functioning as a shifting register, eliminates the delay lines commonly used in prior art shifting registers for coupling each adjacent pair of flip-flop units and substitutes gating circuits therefor; one for each flip-flop unit. The gating circuits are so arranged that, upon each insertion of a new binary digit signal into the first flip-flop unit, a simultaneous shifting of each binary digit signal stored in the register to the next following flip-flop unit occurs. This simultaneous shifting is provided in a direct and positive manner by applying timing pulses to a first input terminal of each of the flip-flop units and applying the same timing pulse to the gating circuit associated with the flip-flop unit, the output of the gating circuit being applied to a second input terminal of the following flip-flop unit. Each gating circuit passes the timing pulses applied thereto only in response to one conduction state of its associated flip-flop unit. Each flip-flop unit is so constructed that pulses applied simultaneously to its first and second input terminals trigger the flip-flop in one direction in accordance with the pulse applied to its second input terminal, while a timing pulse applied singularly to its first input terminal triggers the flip-flop in the other direction.

Therefore, each binary digit signal shifted into the first flip-flop unit controls the triggering of the second flip-flop unit during the appearance of the next binary digit signal with the result that the second flip-flop unit then stores the binary digit signal previously stored by the first flip-flop unit. In the same manner, each of the other flip-flop units controls the triggering of the following flip-flop unit so that the binary digit signals successively stored by the first flip-flop unit are progressively shifted down and stored by the succeeding flip-flop units. Each shifting occurs simultaneously with the appearance of a timing pulse, thereby allowing the circuit to operate at an extremely rapid rate as well as reducing the probability of error in reading out the binary digit signals stored by the circuit at any desired instant.

The switching and counting circuit of the present invention, functioning as a high speed counter, also provides an advance over prior art binary counters wherein the most usual triggering arrangements for each of the cascaded flip-flop units is provided solely by the change of conduction state of the immediately preceding flip-flop. Thus, assuming a large number of flip-flops in the conventional counter, a considerable time delay occurs between the appearance of an input pulse and the triggering of the final flip-flop unit owing to the sequential triggering of the preceding flip-flop units. The circuit of the present invention, functioning as a counter, eliminates the sequential triggering of the successive flip-flop units, and thereby eliminates the resultant time delay. In the circuit of this invention, all flip-flops are triggered simultaneously by the input pulse to be counted. This type of operation is provided for by means of a normally-closed gating circuit for each flip-flop unit, the gating circuit being opened to pass the input pulse to the following flip-flop unit in accordance with a given voltage level simultaneously produced by its corresponding flip-flop unit and all of the immediately preceding flip-flop unit.

The switching and counting circuit of the present invention, functioning as a stepped waveform signal generator, provides advantages over the prior art waveform generators. One prior art stepped waveform signal generator produces the steps in its output signal by a summation of current increments, each stage of the generator requiring five tubes. Two of the tubes are employed as constant current devices in order that equal increments of current may be added to produce equal potential differences between adjacent steps. The circuit of the present invention, functioning as a stepped waveform signal generator, operates on a potential summation principle, and produces an accurate stepped waveform with considerably less circuitry and power drain than the current summation devices.

The parallel-set register function of the circuit, according to the present invention, is provided for by a switching means coupled between one input terminal of each flip-flop unit and a source of potential. The switching means of those flip-flop units which are to store a signal representing one binary digit value are actuated and the resulting conduction state of the actuated flip-flop units represent that binary digit value. The conduction state of the unactuated flip-flop units represent the other binary digit value.

The digital-to-analog converter function of the switching and counting circuit of the present invention provides for the conversion of a binary number into an analog potential whose magnitude is equivalent to the magnitude of the binary number. The conversion is effected by applying the signals representing the digits of the binary number to be converted to the flip-flop units of the circuit and then summing up the output voltage levels of the flip-flop units by the potential summation principle mentioned above. In this manner, the conversion of a binary number to an analog equivelent may be performed rapidly and accurately. The binary numbers to be converted may either be shifted serially into the circuit when it functions as a shifting register, or may be placed therein by the parallel-set method.

A storage tube is illustrated in conjunction with the switching and counting circuit of the present invention and is utilized when the circuit functions as a stepped waveform signal generator. The stepped output signal of the circuit produces a series of spots on the storage electrodes of the tube, each spot of which, in turn, may be charged to one of two values and thereby constitute a storage element for a binary digit signal occurring elsewhere in a computation process. Other uses for the switching and counting circuit of the present invention, other than those thus far set forth, are also noted.

It is, therefore, an object of this invention to provide a shifting and counting circuit operable on a time-sharing basis as either a shifting register, a high speed counter, a stepped waveform signal generator, a parallel-set register or a digital-to-analog converter.

An additional object of the invention is to provide a device for either counting the number of pulses of one signal or shifting in and storing a series of voltage levels of another signal representing a series of binary digits, respectively.

Another object of the present invention is to provide a device for selectively producing either a stepped waveform signal or an anolog potential equivalent to a given binary number.

Still another object is to provide a device for counting the number of pulses of one signal and producing a stepped waveform signal corresponding thereto, or shifting in and storing a series of voltage levels of another signal representing a series of binary digits, respectively, of a binary number.

A further object of the present invention is to provide a device for counting the number of pulses of one signal and producing a stepped waveform signal corresponding thereto, or shifting in and storing a series of voltage levels of another signal representing a series of binary digits, respectively, of a binary number, or simultaneously storing a series of binary digits of another binary number as a series of voltage levels, respectively, in a parallel-set manner and producing an analog potential whose magnitude is equivalent to the stored other binary number.

A still further object of the present invention is to provide a device including a shifting register circuit in conjunction with a ladder attenuation network which produces an analog potential whose magnitude is equivalent to a binary number stored by the shifting register.

An additional object is to provide a device for producing an analog potential equivalent to a binary number, said binary number being either shifted into and stored as output voltage levels of a series of flip-flop units arranged as a shifting register or set simultaneously into the series of flip-flop units in a parallel-set manner.

Still another object of the present invention is to provide a device for sequentially shifting in and storing a series of binary digit signals as a series of voltage levels, respectively, and simultaneously therewith producing an analog potential whose magnitude is equivalent to the magnitude of the binary number thus stored.

A still further object of the present invention is to provide a switching and counting circuit including a series of flip-flop units for both counting the number of pulses of a signal, in which each flip-flop unit is triggered in accordance with a given conduction state of all preceding flip-flop units of the series, and producing a stepped waveform signal, each of the steps of which corresponds to an input pulse.

The novel features which are believed to be characteristic of the invention, both as to its organization and method of operation, together with further objects and advantages thereof, will be better understood from the following description considered in connection with the accompanying drawings. It is to be expressly understood, however, that the drawings are for the purpose of illustration and description only, and are not intended as a definition of the limits of the invention.

Fig. 1 is a circuit diagram of a flip-flop unit suitable for use in the circuit of Fig. 2;

Fig. 2, which comprises Figs. 2A and 2B, is a circuit diagram of a switching and counting circuit according to the present invention with associated input and output devices therefor;

Figure 1:
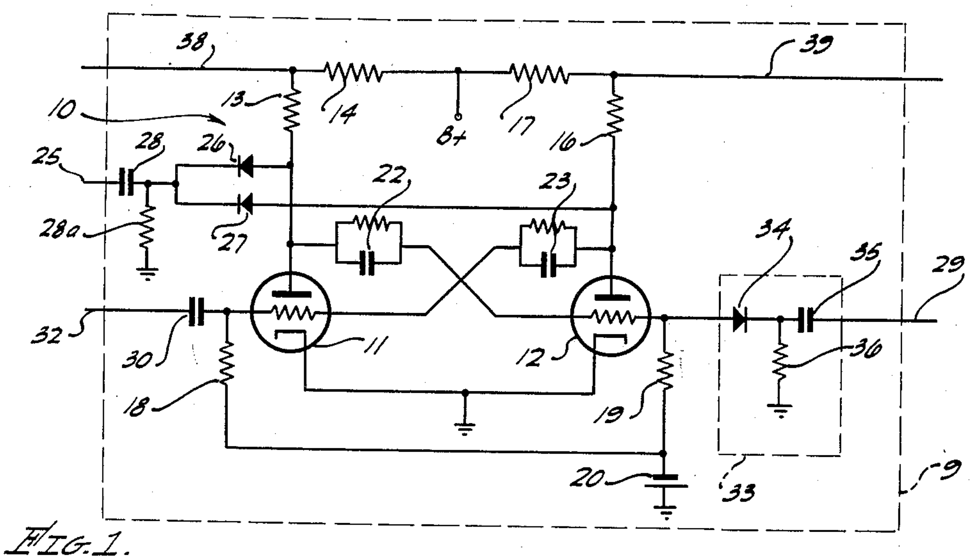

Referring now to the drawings, there is illustrated in Fig. 1, one form of a device for producing alternate high and low voltage levels, such as flip-flop unit 9, suitable for use in the electronic switching and counting circuit according to the present invention. The flip-flop unit comprises a conventional bistable flip-flop 10 in combination with a triggering unit 33, and is similar to that shown and described in the copending United States application for patent, Serial No. 245,737, filed September 8, 1951, for "Triggering Networks for Flip-Flop Circuits" by Daniel L. Curtis.

In particular, flip-flop 10 includes two triodes 11 and 12, the cathodes of which are mutually grounded. The anode or plate of triode 11 is connected to the B+ terminal of a source of direct-current potential (not shown) through serially connected resistors 13 and 14, while the plate of triode 12 is connected to the B+ terminal through serially connected resistors 16 and 17. The plate of triode 11 is coupled to the grid of triode 12 through a paralleled resistor-capacitor combination 22, while the plate of triode 12 is coupled to the grid of triode 11 through a paralleled resistor-capacitor combination 23. The grids of triodes 11 and 12 are connected through resistors 18 and 19, respectively, to the negative terminal of a source of direct-current potential, such as a battery 20, the positive terminal of battery 20 being grounded.

One input conductor 25 of flip-flop unit 9 is coupled through a differentiating circuit, comprising a capacitor 28 and a resistor 28*a*, to the cathodes of two rectifying devices, such as diodes 26 and 27. The anodes of diodes 26 and 27 are coupled to the plates of triodes 11 and 12, respectively. Flip-flop unit 9 has another input conductor 32 coupled to the grid of triode 11 through a coupling capacitor 30, and still another input conductor 29 coupled to the grid of triode 12 through a triggering network 33. Triggering network 33 includes a serially connected diode 34 and a differentiating network comprising a capacitor 35 and a shunt resistor 36. Flip-flop unit 9 has a first output conductor 38 connected to the common junction of resistors 13 and 14, and a second output conductor 39 coupled to the common junction of resistors 16 and 17.

In operation, each negative pulse applied through input conductor 25 triggers flip-flop 10 into changing its conduction state. For example, if triode 11 were nonconducting and triode 12 were conducting, a negative pulse applied through conductor 25 would be conducted through diode 26 to the plate of triode 11 and from there through resistor-capacitor combination 22 to the grid of triode 12 with the result that triode 12 would cease conduction. The resulting change of plate potential of triode 12 would be reflected as a potential rise, through resistor-capacitor combination 23, at the grid of triode 11, thereby initiating the conduction thereof. Owing to the symmetry of the circuit, a reverse conduction state would result from the next negative pulse appearing on conductor 25.

When simultaneous negative pulses are applied to input conductors 29 and 32, the operation of the flip-flop is identical to that shown and described in the above-mentioned patent application, Serial No. 245,737, now Patent No. 2,723,080, by Daniel L. Curtis. Triggering circuit 33 sharpens the pulse applied on conductor 29 by action of the differentiating resistor 36 and capacitor 35, and the sharpened pulse would be overridden by the normal pulse to produce high and low voltage levels on output conductors 38 and 39, respectively. However, if a pulse were applied only to conductor 29, flip-flop 10 would be triggered so that low and high voltage levels would be produced on output conductors 38 and 39, respectively. All subsequent pulses applied singularly on conductor 29 would have no effect on the output state of flip-flop 10 since the grid of triode 12, to which they would be applied, is already at cut-off.

Figures 2, 2B:
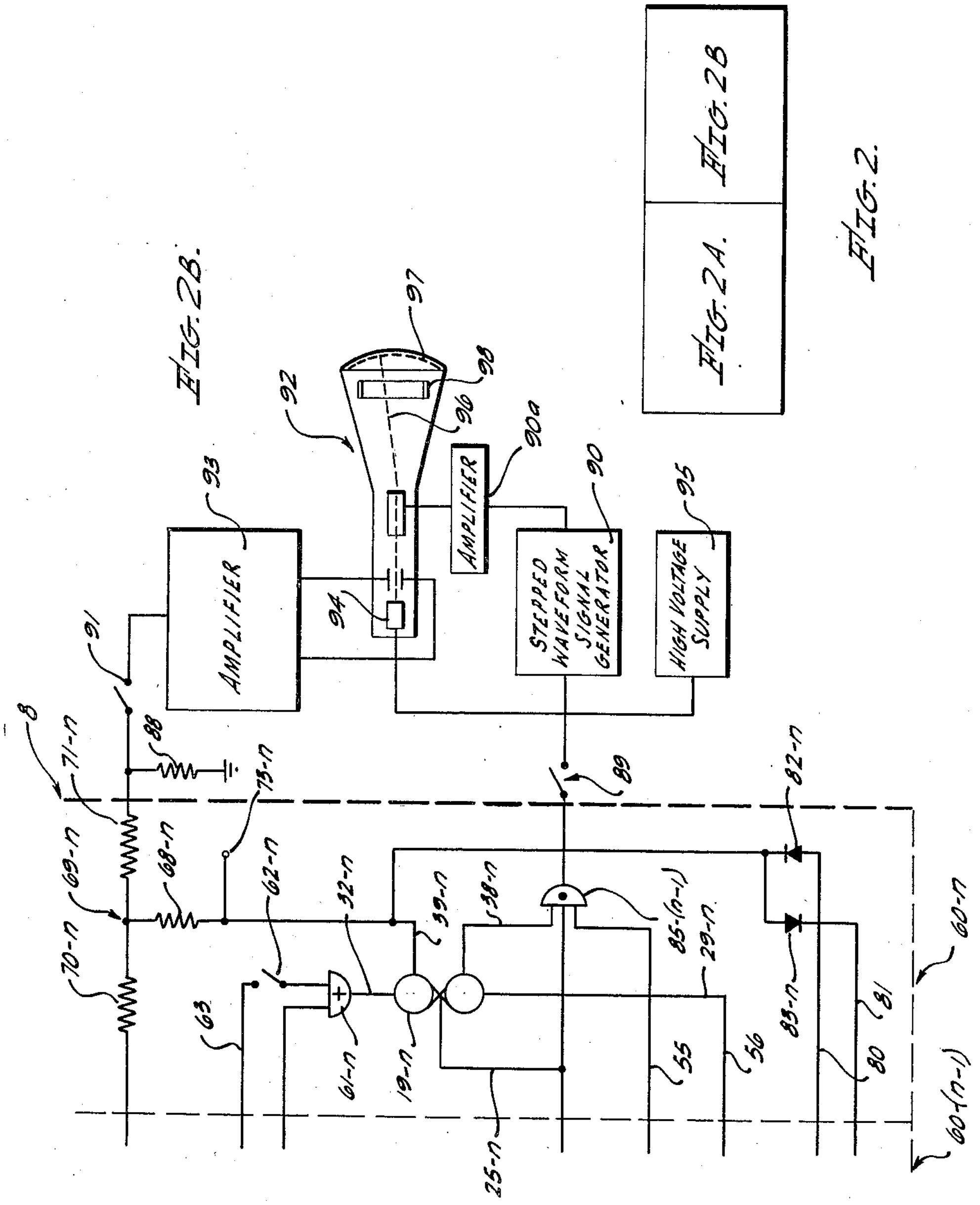
Figure 2A:
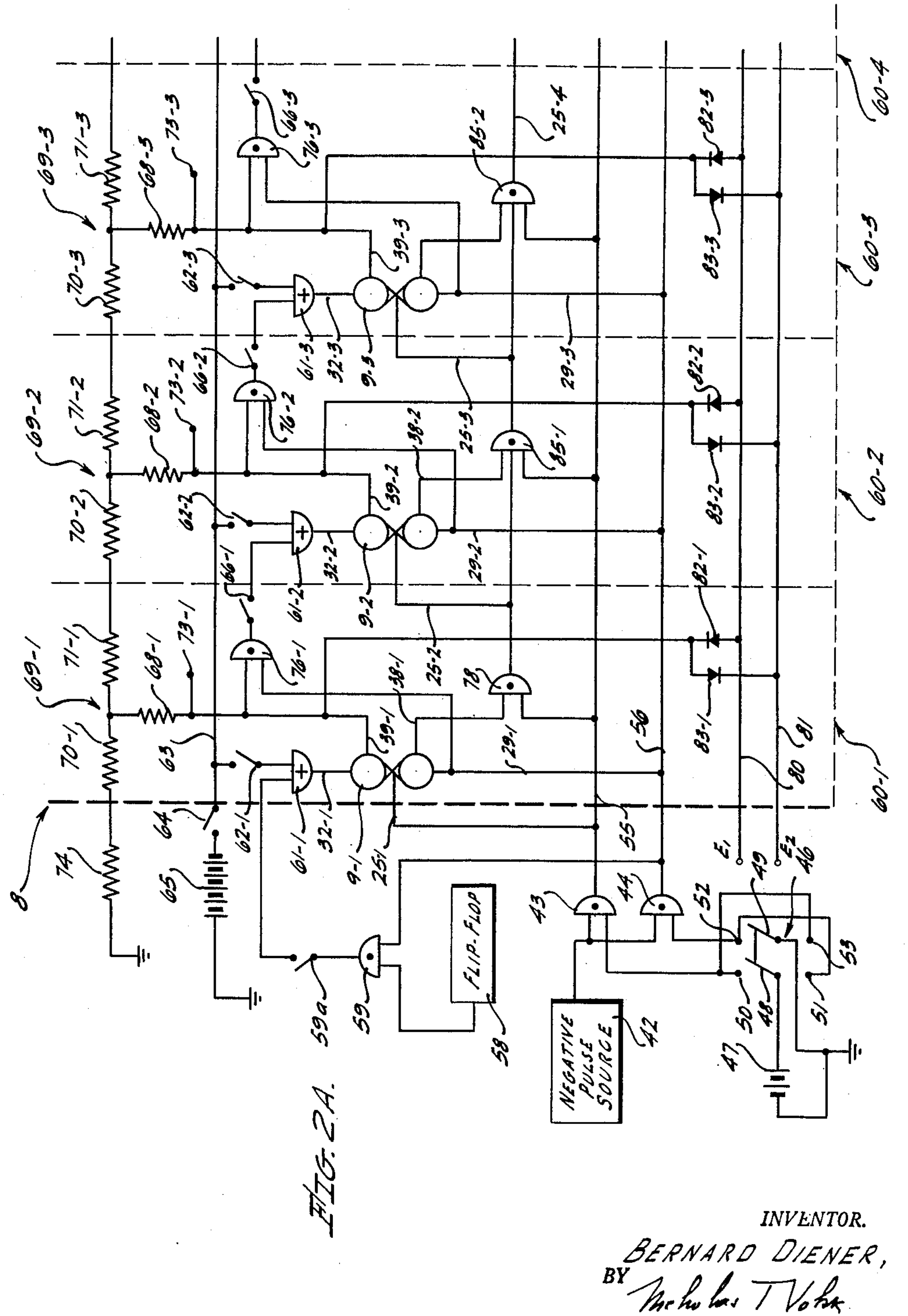

Referring now to Fig. 2 there is shown an electronic switching and counting circuit according to the present invention, including associated circuitry, which may serve on a time-sharing basis either as a shifting register, a high speed counter, a wave-form generator, a parallel-set register or a digital-to-analog converter.

A source 42 of negative pulses has its output terminal connected to one input terminal of a two terminal "and" gate circuit 43, hereafter referred to as the counting gate circuit, and to one input terminal of another two terminal "and" gate circuit 44, hereafter referred to as the addressing gate circuit. Counting gate circuit 43 and addressing gate circuit 44 each may be of the type as illustrated in Fig. 1 of copending United States patent application Serial No. 245,860, filed September 10, 1951, for "High Speed Flip-Flop Counter" by Eldred C. Nelson. As will be more clearly understood later when the operation of the circuit of Fig. 2 is described, negative pulse source 42 is operable for presenting electrical clock pulse signals to gates 43 and 44 when the circuit of Fig. 2 is operating in any of its different modes of operation, such as a counter or register, for example. It should be understood, therefore, that negative pulse source 42 is capable of providing a first electrical pulse train when the circuit of Fig. 2 is operated as a shifting register, and a second electrical pulse train when the circuit is operated as an electronic counter, and that the pulse repetition rate or pulse frequency of each of these signal trains may be different from each other or identical, as desired.

The other input terminal of counting gate circuit 43 is connected to fixed switch points 50 and 53 of a double-pull double-throw switch 46 having two movable arms 48 and 49 connected to the positive and negative terminals, respectively, of a source of direct-current potential, such as battery 47, the negative terminal thereof being grounded. The other input terminal of addressing gate circuit 44 is connected to the fixed switch points 51 and 52 of switch 46. When movable switch arms 48 and 49 are in the upper position, as viewed in Fig. 2, switch points 50 and 52 are connected to the positive and negative terminals, respectively, of battery 47. When the switch arms are in the lower position, as viewed in Fig. 2, switch points 51 and 53 are connected to the positive and negative terminals, respectively, of battery 47. Counting and addressing gate circuits 43 and 44 have their output terminals connected to counting and addressing busses 55 and 56, respectively.

A device for producing alternate high and low voltage levels, such as a flip-flop 58, has an output terminal connected to one input terminal of a two terminal "and" gate circuit 59, similar to gate circuits 43 and 44. Circuit 59 has its other input terminal connected to addressing bus 56, while its output terminal is connected through a normally open-switch **59*a* to one input terminal of an "or" gate circuit 61–1. Circuit 61–1 constitutes a portion of the first switching and counting unit, generally designated 60–1, of electronic switching and counting circuit 8, and may be of the two-terminal type illustrated in Fig. 4 of copending United States application for patent, Serial No. 189,318, filed October 10, 1950, for "Arithmetic Units for Digital Computers" by Eldred C. Nelson. The other input terminal of circuit 61–1 is connected through a normally open switch 62–1 to a parallel-set bus 63 which has one end connected through a normally open switch 64 to the negative terminal of a source of direct-current potential, such as a battery 65, the positive terminal of battery 65** being grounded.

The output of "or" gate circuit 61–1 is applied to input conductor 32–1, corresponding to input conductor 32 of Fig. 1 of flip-flop unit 9–1, similar to flip-flop unit 9 of Fig. 1. Input conductor 25–1, corresponding to conductor 25 of Fig. 1, of flip-flop unit 9–1, is connected to counting bus 55 while the remaining input conductor 29–1, corresponding to conductor 29 of Fig. 1, of flip-flop unit 9–1 is connected to addressing bus 56.

Output conductor 39–1, corresponding to output conductor 39 of Fig. 1, of flip-flop unit 9–1 is connected to one end of a leg resistor 68–1 of a T-section attenuation network 69–1. T-section network 69–1 also includes two arm resistors 70–1 and 71–1, mutually connected to the other end of resistor 68–1. Resistor 70–1 is connected through a terminating resistor 74 to ground.

Output conductor 39–1 is also connected to a counting output terminal 73–1 and to one input terminal of a two terminal "and" gate circuit 76–1, which may be similar to gate circuits 43 and 44. The other input terminal of circuit 76–1 is connected to input conductor 29–1 while the output conductor of circuit 76–1 is connected through a normally-open switch 66–1 to one input terminal of an "or" gate circuit 61–2, positioned within switching and counting unit 60–2, circuit 61–2 corresponding to circuit 61–1 of unit 60–1.

Output conductor 39–1 of flip-flop 9–1 is further connected to two clamping busses 80 and 81, respectively, through diodes 82–1 and 83–1, respectively. The anode of diode 82–1 is connected to clamping bus 80, while the cathode of diode 83–1 is connected to clamping bus 81. Clamping busses 80 and 81 are connected to the positive terminals $E_1$ and $E_2$, respectively, of two sources of direct-current potential (not shown).

The other output conductor 38–1 of flip-flop 9–1, corresponding to conductor 38 in Fig. 1, is connected to one input terminal of a two terminal "and" gate circuit 78 which may be similar to circuits 43 or 44. Circuit 78 has its other input terminal connected to counting bus 55, and its output terminal connected to input conductor 25–2 of flip-flop unit 9–2. The output terminal of circuit 78 is also connected to one of the input terminals of a gate circuit 85–1 of the next unit 60–2.

Switching and counting unit 60–2 is structurally similar to unit 60–1, the corresponding elements in the units 60–1 and 60–2 being designated by the same number but followed by a hyphen and the digits 1 and 2, respectively. The essential difference between unit 60–1 and unit 60–2 is that unit 60–2 includes a three terminal "and" gate circuit 85–1 instead of the two terminal "and" gate circuit 78. Gate circuit 85–1 is set forth in more detail in Fig. 4 of this disclosure and its mode of operation will be presented in connection therewith.

As has been stated previously, one input terminal of circuit 85–1 is connected to the output terminal of gate circuit 78. Gate circuit 85–1 has a second input terminal connected to output conductor 38–2 of flip-flop unit 9–2, while the remaining input terminal of circuit 85–1 is connected to counting bus 55. The output terminal of circuit 85–1 is connected to both input conductor 25–3 of flip-flop unit 9–3 of the following switching and counting unit 60–3 and to one input terminal of gate circuit 85–2 of unit 60–3.

Unit 60–2 further includes a T-section attenuation network 69–2, similar to network 69–1 of unit 60–1. The arm resistor 70–2 of network 69–2 is connected to arm resistor 71–1 of unit 60–1, while arm resistor 71–2 of T-section 69–2 is connected to arm resistor 70–3 of T-section 69–3 of unit 60–3. As has been mentioned, one input terminal of "or" gate circuit 61–2 is connected to the output terminal of circuit 76–1 through switch 66–1. The other input terminal of circuit 61–2 is connected through switch 62–2 to the parallel-set bus 63, while its output terminal is connected to input conductor 32–2 of flip-flop unit 9–2.

The structure of the switching and counting unit 60–3 is identical to that illustrated and described for switching and counting unit 60–2, the corresponding elements being given the same number but followed by a hyphen and the digit 3. The connections between the elements of unit 60–2 and unit 60–3 are identical to the connections illustrated and described as existing between corresponding elements of units 60–1 and 60–2. Also, similar connections exist between the parallel-set bus, the counting bus, the address bus, the clamping bus, etc., and the various elements in unit 60–3 as those shown and described for unit 60–2.

Following switching and counting 60–3, are other switching and counting units identical thereto but not specifically illustrated. Each of these units is connected to its immediately preceding unit in the manner illustrated for the connection of unit 60–3 to unit 60–2, as well as being connected to the clamping bus, the parallel-set bus, the addressing bus and the counting bus in the manner illustrated for unit 60–3.

The series of switching and counting units are terminated by a final unit **60–*n*, similar to the units 60–2 and 60–3, except that it contains no "and" gate circuit corresponding to the gate circuits 76–1 and 76–2**.

Resistor arm **71–*n* of T-section 69–*n* is connected to ground through a terminating resistor 88. The common junction of resistor 71–*n* and terminating resistor 88 is connected through a normally-open switch 91 and an amplifier 93 to the vertical deflection plates of a memory or storage tube 92, of conventional type. The output terminal of gate circuit 85–(*n*—1) is connected through a normally-open switch 89 to an input terminal of a stepped waveform signal generator 90, which may be similar to switching and counting circuit 8 functioning as a signal generator or similar to the waveform generator shown and described in the United States application for patent, Serial No. 241,997, now Patent No. 2,709,770, for "Stepped Signal Producing System," filed August 15, 1951, by Siegfried Hansen. The output terminal of circuit 90 is connected to the horizontal deflection plates of storage tube 92 through an amplifier 90*a***.

Storage tube 92 also includes an electron gun 94 connected to an external high voltage supply 95, gun 94 emitting an electron beam 96 which strikes a target electrode 97. A collector electrode 98, positioned adjacent target electrode 97, is also included within tube 92 for controlling the charge placed on any spot connected by beam 96 on target electrode 97.

In operation, electronic switching and counting circuit 8 may be utilized on a time-sharing basis as a shifting register, a high-speed counter, a waveform generator, a parallel-set register, or a digital-to-analog converter. The first function to be described for the circuit is that of a shifting register, which function is performed when movable switch arms 48 and 49 of switch 46 contact fixed switch points 51 and 53, respectively. With switch 46 in this position, the positive potential of battery 47 is applied to addressing gate circuit 44, while ground potential is applied to counting gate circuit 43. The ground potential is insufficient to open counting gate circuit 43 and, thus, the pulses from source 42 are blocked from counting bus 55. On the other hand, addressing gate circuit 44 is opened by the positive potential of battery 47 and applies the pulses from source 42 to addressing bus 56. Also, normally open switches **59*a*, 66–1, 66–2, . . . , 66–(*n*—1)**, are closed so that circuit connections will be made between their respective switch arms and switch points.

Figure 3:
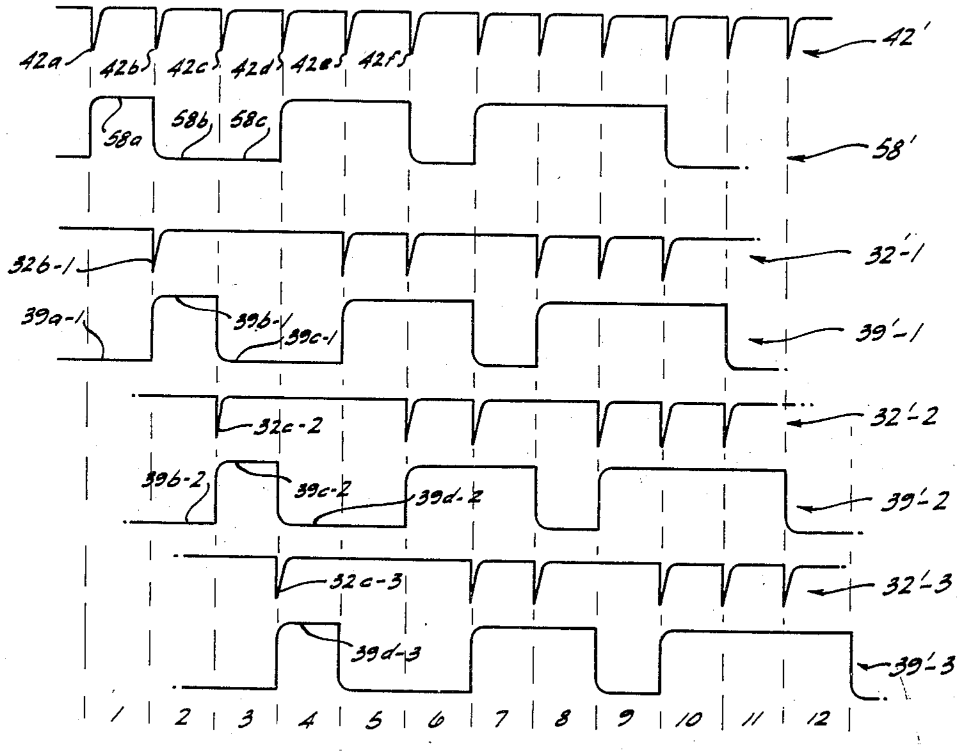
Figs. 3, 6, 7 and 9 are composite groups of signal waveforms appearing at various points in the circuit of Fig. 2 when the circuit functions as a shifting register, counter, stepped waveform signal generator, and digital-to-analog converter, respectively.

To illustrate the operation of circuit 8 as a shifting register, reference is made to Fig. 3 which is a composite diagram of the signal waveforms appearing at various points in the circuit diagram of Fig. 2. In order to simplify this explanation, assume that the flip-flop units initially produce their low voltage level on their respective output conductors 39–1, 39–2, etc.

The output signal, generally designated 42′, of negative pulse source 42 comprises a series of negative pulses appearing at regular timing intervals while the output signal of flip-flop 58, generally designated 58′ in Fig. 3, comprises a series of alternate high and low voltage levels appearing during the timing intervals. The high voltage level represents, by way of example, the binary digit 1 while the low voltage level represents the binary digit 0. The output signal of gate circuit 59, is applied to input conductor 32–1 of flip-flop unit 9–1 through "or" gate circuit 61–1, and the signal, generally designated 32′–1 of Fig. 3, appears on conductor 32–1.

Pulse **42*a* of signal 42′, appearing at the beginning of the first interpulse interval, as signal 58′ changes from its initial low voltage level to the first high voltage level 58*a*, will be blocked by "and" gate circuit 59. Pulse 42*a* is also applied from addressing bus 56 to the other input conductor 29–1 of flip-flop unit 9–1, however, since flip-flop unit 9–1 is producing its low voltage level on output conductor 39–1, the application of a negative pulse to conductor 29–1 will not trigger unit 9–1. The signal, generally designated 39′–1 in Fig. 3, appearing on output conductor 39–1, illustrates the low voltage level 39*a*–1** produced during this first interpulse interval.

At the beginning of the second interpulse interval, high voltage level **58*a* of signal 58 is applied to gate circuit 59. Accordingly, the next pulse 42*b* of signal 42 will be passed by gate circuit 59 and will appear on input conductor 32–1 as pulse 32*b*–1 of signal 32′–1. The same pulse 42*b* will be applied simultaneously to the other input conductor 29–1 from addressing bus 56. Under these conditions, flip-flop unit 9–1 will be triggered by pulse 32*b*–1 appearing on conductor 32–1 owing to the overriding effect noted in connection with the flip-flop unit according to Fig. 1. Accordingly, flip-flop unit 9–1 will be triggered into changing its conduction state, and will produce high voltage level 39*b*–1 of signal 39′–1** during the second interpulse interval.

During the second interpulse interval, flip-flop 58 produces low voltage level **58*b* of signal 58, and pulse 42*c* of signal 42 appearing at the beginning of the third interpulse interval is accordingly blocked by gate circuit 59. Thus, pulse 42*c* is applied solely from addressing bus 56 to input conductor 29–1 and triggers flip-flop unit 9–1 into producing low voltage level 39*c*–1** during the third interpulse interval.

In the manner just explained for the first three interpulse intervals, it may be readily understood how the remaining high and low voltage levels of signal 39′–1 are produced by the triggering of flip-flop unit 9–1 in accordance with the high and low voltage levels of signal 58' taken in conjunction with the pulses of signal 42'. It will be observed that the voltage levels produced by flip-flop unit 9–1 follow in sequence the voltage levels produced by flip-flop 58, the only difference being that each voltage level of signal 39'–1 is delayed one timing or interpulse interval from its corresponding voltage level of signal 58'.

Consider now the operation of flip-flop unit 9–2. The output signal of gate circuit 76–1 is applied through "or" gate circuit 61–2 to input conductor 32–2 of flip-flop unit 9–2 and the signal, generally designated 32'–2, appearing on conductor 32–2, is illustrated in Fig. 3. During the first interpulse interval, signal 39'–1 applied to gate 76–1 is at low voltage level **39*a*–1, and gate circuit 76–1 blocks both pulses 42*a* and 42*b* of signal 42'. Pulses 42*a* and 42*b* are applied directly to input conductor 29–2 of unit 9–2, but do not alter the conducting state of unit 9–2. As a result, the signal, generally designated 39'–2 in Fig. 3, appearing on conductor 39–2, remains at low voltage level 39*b*–2** during the first and second interpulse intervals.

At the beginning of the third interpulse interval, signal 39'–1 is at its high voltage level **39*b*–1, and pulse 42*c* will be passed by gate circuit 76–1. Accordingly, pulse 42*c* will appear simultaneously on both input conductors of unit 9–2, and, owing to the overriding action described above, will trigger flip-flop unit 9–2 into producing high voltage level 39*c*–2 of signal 39'–2** during the third interpulse interval.

The next pulse **42*d* will be blocked from input conductor 32–2 by gate circuit 76–1 owing to the low voltage level 39*c*–1 produced by flip-flop unit 9–1 during the third interpulse interval. Hence, flip-flop unit 9–2 will be triggered by pulse 42*d* and signal 39'–2 will be at its low voltage level 39*d*–2 during the fourth interpulse interval. The formation of the remaining voltage levels of signal 39'–2** may be readily understood from the description set forth above.

It will be noted that the voltage levels of signal 39'–2 correspond in sequence to the voltage levels of signals 39'–1, but with each voltage level of signal 39'–2 lagging its corresponding voltage level of signal 39'–1 one interpulse interval. Accordingly, output signal 39'–2 of unit 9–2 corresponds to input signal 58' shifted two interpulse intervals to the right, as viewed in Fig. 3.

The signal, generally designated 39'–3 of Fig. 3, appearing on output conductor 39–3 of flip-flop unit 9–3 is similar to output signal 39'–2 of flip-flop unit 9–2 and it is considered that no detailed description of its derivation need be set forth. It will be observed that the sequence of voltage levels of signal 39'–3 correspond to the sequence of voltage levels of signal 39'–2, but with each voltage level thereof lagging its corresponding voltage level by one interpulse interval.

Although the operation of only the first three stages of electronic switching and counting circuit 8 as a shifting register is set forth, it is understood that the remaining units, up to and including final unit **60–*n*, operate similarly to the first three units. Since the output voltage levels produced by each flip-flop unit lag the voltage levels produced by the immediate preceding flip-flop unit by one interpulse interval, it is apparent that the voltage levels appearing simultaneously on the output conductors 39–1, 39–2, 39–3, etc., will represent the successive voltage levels produced by flip-flop 58 during the successive interpulse intervals. In other words, the successive binary digits represented by the voltage levels of signal 58'** occurring during successive interpulse intervals will appear simultaneously as binary digits represented by the voltage levels appearing on the output conductors of the successive flip-flop units.

As will be apparent to those skilled in the art, circuit 8 may be transformed into a circulating register by adding a gate circuit, similar to circuits 76–1, 76–2, etc., with suitable switching means between the final switching and counting unit **60–*n* and the input terminal 32–1 of flip-flop unit 9–1. Thus, after insertion of a binary number into circuit 8** by a shifting register operation, and closing of the above-noted switching means, the signals representing the digits of the stored binary number will circulate around the resulting closed loop.

The next function to be described for circuit 8 of Fig. 2 is that of a high speed counter. This function is produced when movable switch arms 48 and 49 of switch 46 contact switch points 50 and 52, respectively, so that the positive potential of battery 47 is applied to counting gate circuit 43, and the negative or ground potential is applied to addressing gate circuit 44. Accordingly, addressing gate circuit 44 blocks all negative pulses applied thereto from pulse source 42 while counting gate circuit 43 is opened and passes the negative pulses from pulse source 42 to counting bus 55.

That portion of circuit 8 functioning as a counter is similar to the counter of the before-mentioned copending United States patent application, Serial No. 245,860 of Eldred C. Nelson. The most significant structural difference between the two circuits is that, in the counter of this application, three terminal "and" gate circuits 85–1, 85–2, etc., are employed in each switching and counting unit instead of the two two-terminal "and" gate circuits employed in each unit of the counter of the earlier application. Before continuing with the description of circuit 8 functioning as a counter, it is necessary to set forth the structure and mode of operation of one of the three terminal "and" gate circuits, as, for example, circuit 85–1 of switching and counting unit 60–2.

Figure 4:
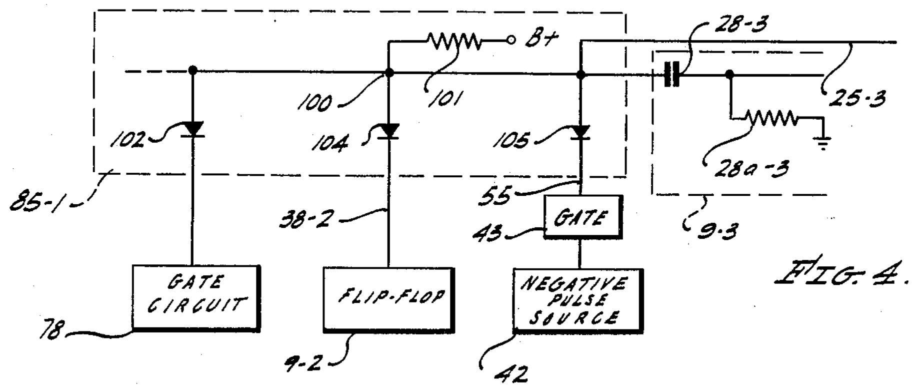
Fig. 4 is a circuit diagram of a gate circuit suitable for use in the circuit of Fig. 2.

Referring now to Fig. 4, which is a detailed circuit diagram of circuit 85–1, the output terminal of gate circuit 78 is connected through a rectifying device, such as a diode 102, to one end 100 of a resistor 101, the other end of resistor 101 being connected to the B+ terminal of a source of direct-current potential (not shown). The magnitude of the potential appearing at the B+ terminal is preferably equal to the high voltage levels produced by the flip-flop units. End 100 is coupled to output conductor 38–2 of flip-flop 9–2 through a diode 104, and to negative pulse source 42 through serially connected diode 105, counting bus 55 and gate circuit 43. End 100 is also coupled to the differentiating circuit, comprising capacitor 28–3 and resistor **28*a*–3, of flip-flop unit 9–3**.

Figures 5, 7, 8:
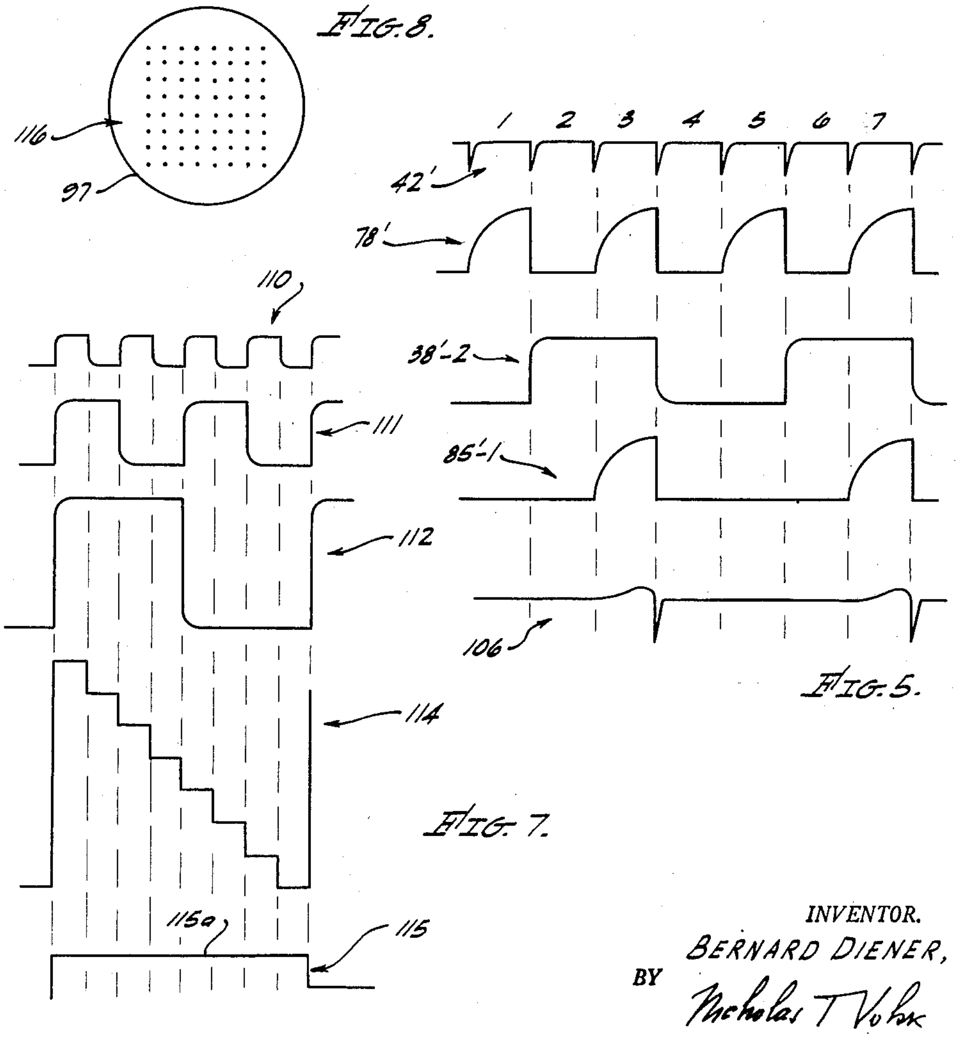
Fig. 5 is a composite group of signal waveforms appearing at various points in the circuit of Fig. 4.
Fig. 8 is a schematic diagram of a group of spots on the storage tube target electrode of Fig. 2.

Referring now to Fig. 5, there is shown a composite diagram of signal waveforms appearing at various points in the circuit of Fig. 4. With counting gate circuit 43 open, the output signal, generally designated 42', of negative pulse source 42 appears on counting bus 55. Signal 42' is normally at the high voltage level produced by the flip-flop units and is driven to the low voltage level of the flip-flop units at the peak of each negative pulse. The output signal, generally designated 78', of gate circuit 78 comprises a series of alternate low and high voltage levels appearing during the series of interpulse intervals, respectively, of signal 42'. Each of these high voltage levels is actually a charging voltage appearing in the gate circuit which attains, prior to the end of the interpulse interval, the high voltage level. The signal, generally designated 38'–2 in Fig. 5, is the output signal of flip-flop unit 9–2 appearing on output conductor 38–2.

During the first interpulse interval, signal 78 charges to the high voltage level, while signal 38'–2 is at the low voltage level. The voltage of the signal, generally designated 85'–1 of Fig. 5, appearing on end 100 is, during this first interpulse interval, equal to the low voltage level of signal 38'–2, since diode 104 will short end 100 to the low voltage level produced by flip-flop 9–2. All pulses produced by source 42 when end 100 is at the low voltage level will have no effect on the potential of end 100 since diode 105 is back biased and thereby isolates source 42 from end 100.

During the second interpulse interval, end 100 remains at the low voltage level, owing to the low voltage level of signal 78' during this interval. Thus, the pulse of signal 42', appearing at the beginning of the third interpulse interval, is also isolated from end 100.

During the third interpulse interval, signal 38'–2 is at the high voltage level and signal 78' rises upwardly to attain the high voltage level at the end of the interval. Diodes 102 and 104 are accordingly back biased during this interval, owing to the initial low voltage level charge on capacitor 28–3 occasioned by the low voltage levels of end 100 during the preceding interval. By making the resistance of resistor 101 relatively large, capacitor 28–3 will charge relatively slowly therethrough from the B+ terminal and the potential on end 100 during the third interpulse interval will rise upward toward the high voltage level in the manner illustrated in signal 85'–1. As will be apparent, the potential of end 100 cannot rise faster than the rise of signal 78' since any potential of end 100 in excess of the potential of signal 78' will be conducted through the forward resistance of diode 102 to gate circuit 78.

The next negative pulse of signal 42', occurring at the beginning of the fourth interpulse interval, will bring the potential of end 100 down to the low voltage level, that is, the potential of its peak negative value. The lowered potential of end 100 will, in turn, cause capacitor 28–3 to discharge through resistor **28*a*–3. By making resistor 28*a*–3 of a relatively low resistance value, the discharge current of capacitor 28–3 in flowing therethrough will produce a sharp pulse at their common junction as indicated in the signal, generally designated 106 of Fig. 5, appearing across resistor 28*a*–3. Since resistor 28*a*–3 corresponds to resistor 28 of Fig. 1, it is apparent that the pulse produced thereacross by the discharge of capacitor 28–3 will trigger flip-flop unit 9–3** into changing its conduction state.

The remaining portions of the signals illustrated in Fig. 5 may be readily understood from the description of the operation set forth for the first three interpulse intervals. By way of summary, it is seen that gate circuit 85–1 will pass a negative input pulse only if gate circuit 78 and flip-flop unit 9–2 simultaneously produce their high voltage levels during the preceding interpulse interval. Under any other condition, the negative pulse will not be passed by the gate. As will be apparent to those skilled in the art, additional flip-flop units or gate circuits, similar to those shown and described, may be coupled to end 100, the result being that a negative pulse will be passed by the gate circuit only when all such flip-flop units and gate circuits produce their high voltage levels during an interval preceding the appearance of the pulse.

Figure 6:
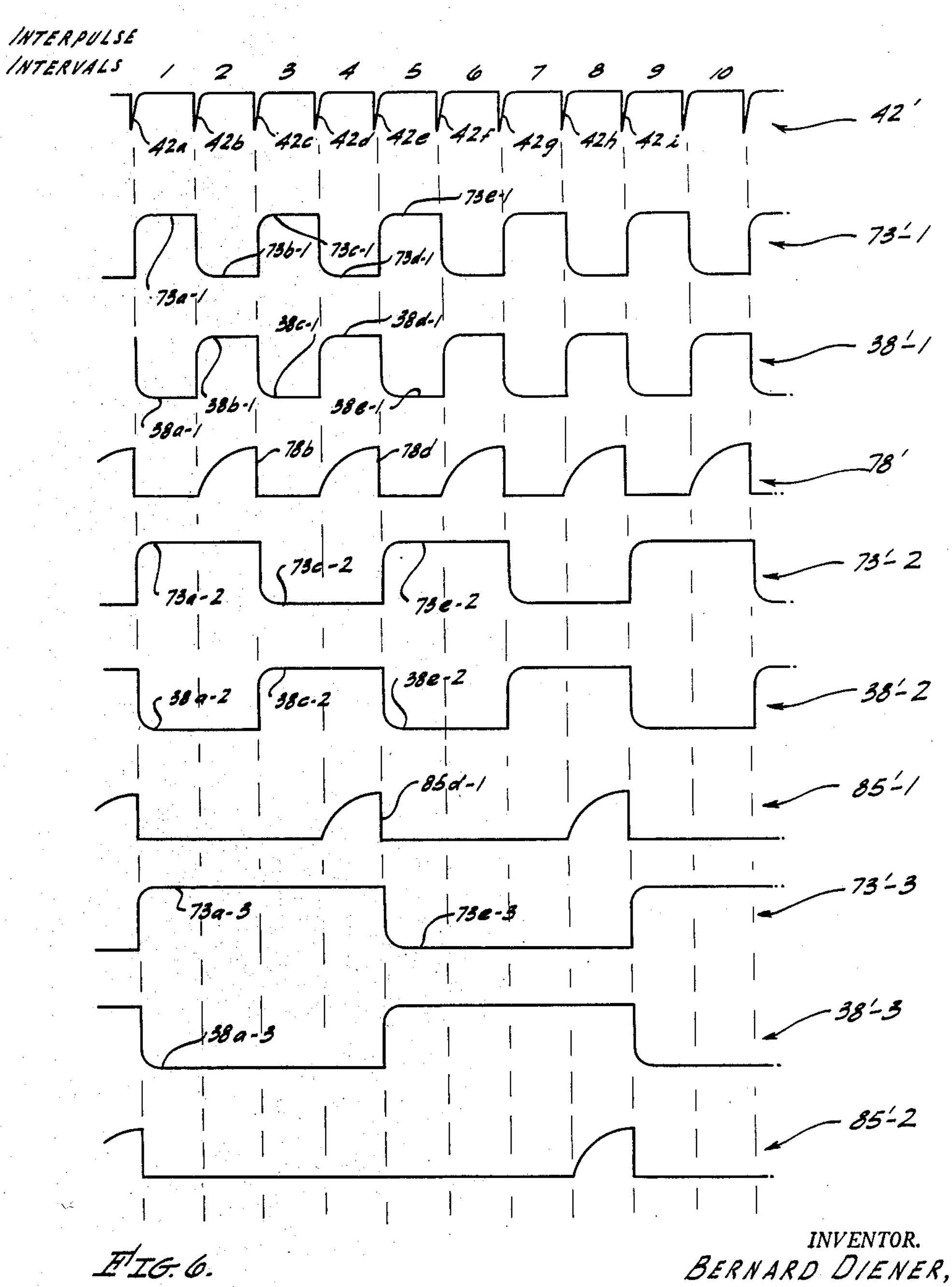

Referring now to Fig. 6, there is illustrated a composite diagram of the signal waveforms appearing at various points in circuit 8 of Fig. 2 during the functioning of the circuit as a counter. The circuit will count down, that is, the binary number count expressed by the voltage levels appearing on the counting terminals will decrease one binary digit in magnitude upon receipt of each pulse from source 42.

The voltage levels appearing on counting terminals 73–1, 73–2, 73–3 . . . **73–*n* represent the units, twos, fours . . . $2^n$'s place digits, respectively, of the total binary count of the pulses received from source 42**. Here, as in the description of previous functions of the circuit, the low voltage level is taken to represent the binary digit 0 while the high voltage level represents the binary digit 1. It is here assumed that all of the flip-flop units are initially producing their low voltage levels on their respective output terminals.

The output signal 42' of pulse source 42 is again illustrated in Fig. 6, for the purpose of clarifying this function of circuit 8. With movable switch arms 48 and 49 of switch 46 thrown upwardly to open counting gate circuit 43, each pulse of signal 42' is applied to input conductor 25–1 from counting bus 55 and triggers flip-flop unit 9–1 into changing its conduction state. The output signal, generally designated 73'–1 in Fig. 6, appears on output conductor 39–1 and counting terminal 73–1, while the signal, generally designated 38'–1 in Fig. 6, appears on output conductor 38–1. Thus, first pulse **42*a* of signal 42' triggers flip-flop unit 9–1 into producing simultaneously high voltage level 73*a*–1 of signal 73'–1 and complementary low voltage level 38*a*–1 of signal 38'–1** during the first interpulse interval.

Since signal 38'–1 was at its high voltage level during the interval preceding the first interpulse interval, the differentiating capacitor in the input circuit of flip-flop unit 9–2, corresponding to capacitor 28 of Fig. 1, will be charged to the high voltage level as is indicated in the signal, generally designated 78' of Fig. 6, appearing on the output terminal of gate circuit 78. The first pulse **42*a*, applied to circuit 78 from counting bus 55, will rapidly discharge the differentiating capacitor, through the resistor in the input circuit corresponding to resistor 28*a* of Fig. 1, to thereby trigger flip-flop unit 9–2 into producing a high voltage level 73*a*–2 of the signal, generally designated 73'–2 in Fig. 6, appearing on counting terminal 73–2. The signal, generally designated 38'–2 in Fig. 6, appearing on output conductor 38–2 of flip-flop unit 9–2, is complementary to signal 73'–2 and is thus at a low voltage level 38*a*–2 during the period signal 73'–2** is at the high voltage level.

Signals 78', 38'–2 and 42' are applied to the three input terminals, respectively, of gate circuit 85–1, and the high voltage levels of signals 78' and 38'–2, produced just prior to the first interpulse interval, charge the input capacitor of flip-flop unit 9–3 to the high voltage level as indicated in the signal, generally designated 85'–1 in Fig. 6, appearing on the output terminal of gating circuit 85–1. This input capacitor is, in turn, discharged by pulse **42*a* and the discharge current triggers flip-flop unit 9–3 into producing a high voltage level 73*a*–3 of the signal, generally designated 73'–3 in Fig. 6, appearing on counting terminal 73–3. Flip-flop unit 9–3 also produces a complementary low voltage level 38*a*–3 of the signal, generally designated 38'–3 in Fig. 6, appearing on output conductor 38–3**.

Signals 85'–1, 38'–3 and 42' are applied to the input terminals, respectively, of "and" gate circuit 85–2, and the high voltage levels of signals 85'–1 and 38'–3, produced just prior to the first pulse **42*a* of signal 42', charge the input capacitor of the next flip-flop unit 9–4 (not shown) to a high voltage level as indicated in the signal, generally designated 85'–2 in Fig. 6, appearing on the output terminal of gating circuit 85–2. Pulse 42*a* subsequently discharges this capacitor to thereby trigger flip-flop unit 9–4** in the manner set forth for the preceding flip-flop units.

Thus, it is seen that the first pulse **42*a* from source 42 triggers the first three flip-flop units simultaneously, so that the initial low voltage levels, representing the binary digit 0, appearing on their counting terminals, are changed to the high voltage levels, representing the binary digit 1. As is also apparent, pulse 42*a*** will trigger all of the remaining flip-flop units simultaneously with the first three units so that the high voltage levels appear simultaneously on all of the counting terminals.

The next pulse **42*b* of signal 42', appearing at the beginning of the second interpulse interval, triggers flip-flop unit 9–1 into producing low voltage level 73*b*–1, representing the binary digit 0, of signal 73'–1. None of the remaining flip-flop units are triggered by pulse 42*b* since each of the gate circuits 78, 85–1, 85–2, etc., have the low voltage level applied to at least one of their input terminals. Thus, during the second interpulse interval, the binary digits represented by the voltage levels appearing on the first three counting terminals 73–3, 73–2, and 73–1** are 1, 1, 0, respectively, which represent the binary number 110.

The next pulse **42*c* of signal 42', appearing at the beginning of the third interpulse interval, triggers flip-flop unit 9–1 into producing high voltage level 73*c*–1 of signal 73'–1. Pulse 42*c* will also discharge the input differentiating capacitor of flip-flop unit 9–2 which had been charged to the high voltage level 78*b* of signal 78' during the second interpulse interval owing to high voltage level 38*b*–1 of signal 38'–1. The discharge of this input differentiating capacitor will trigger flip-flop 9–2 into producing low voltage level 73*c*–2, representing the binary digit 0, of signal 73'–2. Pulse 42*c* is blocked by each of the remaining gate circuits 85–1, 85–2, etc., since the low voltage level is applied to at least one of their input terminals. Accordingly, during the third interpulse interval, the binary digits represented by the voltage levels on the first three counting terminals 73–3, 73–2 and 73–1** are 1, 0 and 1, respectively, which represent the binary number 101.

Pulse **42*d*, appearing at the beginning of the fourth interpulse interval, triggers only flip-flop unit 9–1 and the resulting binary number, represented by the voltage levels appearing on the counting terminals 73–3, 73–2 and 73–1**, is 100.

The next pulse **42*e* of signal 42', appearing at the beginning of the fifth interpulse interval, triggers flip-flop unit 9–1 into producing high voltage level 73*e*–1 of signal 73'–1. Pulse 42*e* also triggers flip-flop unit 9–2 into producing high voltage level 73*e*–2 of signal 73'–2 by discharging the input capacitor unit 9–2 which had been charged during the fourth interpulse interval to high voltage level 78*d* of signal 78'. Pulse 42*e* also triggers flip-flop 9–3 into producing low voltage level 73*e*–3 of signal 73'–3 owing to high voltage levels 78*d* and 38*c*–2 of signals 78' and 38–2, respectively, produced during the fourth interpulse interval and applied to two input terminals of gate circuit 85–1. Thus, during the fifth interpulse interval, the voltage levels appearing on counting terminals 76–3, 76–2 and 76–1** represent the binary number 011.

Summarizing the counting circuit operation thus far presented, the first pulse **42*a* of signal 42, changed the binary number represented by voltage levels appearing on the counting terminals of the first three units from 000 to 111. The succeeding input pulses 42*b*, 42*c*, 42*d* and 42*e* reduced the count from 111 to 110, from 110 to 101, from 101 to 100 and from 100 to 011, respectively. Upon the appearance of the remaining pulses 42*f*, 42*g*, etc., as illustrated, the counter continues counting down. Thus, the count is decreased from 011 to 010 by pulse 42*f* occurring at the beginning of the sixth interpulse interval, from 010 to 001 by pulse 42*g* occurring at the beginning of the seventh interpulse interval and from 001 to 000 by pulse 42*h* occurring at the beginning of the eighth interpulse interval. The next input pulse 42*i* triggers the flip-flop units such that the number 111 is again represented on the counting terminals during the ninth interpulse interval, pulse 42*i* producing the same result as that produced by pulse 42*a***.

Although only the operation of the first three switching and counting units of circuit 8 as a counter is set forth in detail, it is apparent that all of the remaining units operate in a similar fashion with the voltage levels appearing on the consecutive output terminals of these units representing successively higher place digits of the binary number count.

One essential difference between electronic switching and counting circuit 8 operating as a counter and the counter described in the before referred to copending patent application, Serial No. 245,860, by Eldred C. Nelson, is that, in circuit 8, beginning with unit 60–2, a three-terminal "and" gate circuit is employed in each unit, while in the counter of the application, two two-terminal "and" gate circuits are utilized in each counting unit. Thus, if unit 60–2 of circuit 8 were constructed similarly to a corresponding unit of the counter of the above-mentioned application, output conductor 38–1 would be connected to the two input terminals of a first two-terminal "and" gate circuit, similar to gate circuit 78, for example, while counting bus 55 and the output terminal of the first two-terminal "and" gate circuit would be connected to the two input terminals, respectively, of a second two-terminal "and" gate circuit, similar to the first one. The output terminal of this second gate circuit would correspond to the output terminal of gate circuit 85–1 and, accordingly, would be connected to the input conductor 25–3 of the next flip-flop unit 9–3.

Since each two terminal gate circuit of the counter of the above-mentioned application contains two diodes and since each three-terminal gate circuit of circuit 8 contains but three diodes, as is illustrated in Fig. 4, it is apparent that each unit of circuit 8, employed as a counter, contains one less diode than a corresponding unit of the counter of the earlier application. Circuit 8 and the counter of the earlier application perform similarly with respect to such items as speed of counting, delay introduced between units while counting, etc.

By employing "and" gate circuits 85–1, 85–2, etc., in the switching and counting units, each negative pulse to be counted produces a simultaneous triggering of all flip-flop units which change their conduction state to indicate the count of that pulse. Thus, an accurate indication of the total number of pulses counted may be had at any desired instant. This type of operation is in contradistinction to the operation of a majority of prior art flip-flop counterchains in which each pulse to be counted is applied to only the first flip-flop of the chain. The subsequent triggering of this first flip-flop in turn is utilized to control the triggering of the second flip-flop of the chain and the triggering of each of the remaining flip-flops is controlled by the triggering of its immediately preceding flip-flop. Thus, a considerable time delay is introduced between the appearance of each pulse to be counted and the triggering of the final flip-flop with the result that operation at high speeds is rendered difficult if not impossible.

A simplification of circuit 8, functioning as a counter, may be made without appreciably affecting its operation by substituting a two-terminal "and" gate circuit, similar to circuit 78, for circuit 85–2 in unit 60–3, and similar circuits for the three terminal "and" gate circuits in the three following switching and counting units 60–4, 60–5 and 60–6 (not illustrated), while leaving the three-terminal gate circuit in unit 60–2. Similar substitutions could be made for the remaining units of circuit 8, bearing in mind that the gating circuit in each fifth unit should preferably be a three-terminal circuit.

One input terminal of the two-terminal circuit substituted in unit 60–3 would be connected to the output terminal of circuit 85–1 in unit 60–2 while its other input terminal would be connected to output conductor 38–3 of flip-flop unit 9–3. The output terminal of the circuit would be connected to the input conductor of the flip-flop unit in unit 60–4. The other substituted two-terminal gate circuits would be connected in a corresponding manner.

With these substitutions, some of the input pulses must pass in a serial manner through one three-terminal gate circuit and four two-terminal gate circuits before triggering the desired flip-flop. However, the time delay introduced by only five of such gate circuits is not usually sufficient to cause any difficulty in reading out the count at any desired instant nor is the magnitude of any passed pulse decreased sufficiently by the serial passage therethrough to render it ineffective for triggering the flip-flop unit. As is apparent, such a scheme will eliminate four diodes in five switching and counting units.

The substitution set forth above is by way of example only, as it is apparent that the number of consecutive units in which the substitution is made may be varied as determined by the time delay allowable, the particular count being made, and other circuit considerations.

Although a count down operation of circuit 8 has been described, the count indicated by the voltage levels appearing on the other output conductors 38–1, 38–2, . . ., **38–*n*** progressively increases, as may be seen by reference to signals 38′–1, 38′–2, etc., of Fig. 6. Also the circuit may be considered as counting up if the high voltage level appearing on terminals 73–1, 73–2, etc., are arbitrarily chosen to represent the binary digit 0 rather than the binary digit 1 as was assumed in the discussion above, and the low voltage levels represent the binary digit 1.

The next function to be described for switching and counting circuit 8 of Fig. 2, is that of a stepped waveform signal generator. In order to simplify the description of this function, assume that only the first three switching and counting units 60–1, 60–2 and 60–3, are employed, and that resistor arm 71–3 of T-section 69–3 is connected to ground through resistor 88. Switch arm 46 is thrown to its up or counting position with the result that the circuit counts down in the manner set forth in connection with the signals illustrated in Fig. 6.

The arm resistors 70–1, 71–1, 70–2, 71–2, 70–3 and 71–3, of the various T-sections, each has a resistance value of ½C, where C is a constant determined by impedance matching and other circuit considerations. Leg resistors 68–1, 68–2 and 68–3 each has a resistance value of 2C, while each of the terminating resistors 74 and 88 has a resistance value of 3/2*C*, the value 3/2*C* being the characteristic resistance of the ladder network having the arm and leg resistor values set forth above. With these parameters, the network will attenuate the signal appearing on output conductor 39–1 of flip-flop unit 9–1 to 1/16 of its initial value as it is measured across terminating resistor 88, in the manner set forth in the previously referred to copending United States application for patent, Serial No. 241,977, now Patent No. 2,709,770, by Siegfried Hansen.

The signal, generally designated 110 in Fig. 7, illustrates the attenuated output signal 73′–1 of flip-flop unit 9–1, as it appears across resistor 88. The output signal 73′–2 of Fig. 6, of flip-flop unit 9–2, is attenuated by the ladder network to ⅛ of its initial value as it appears across resistor 88, as is illustrated by the signal, generally designated 111 in Fig. 7. Signal 111 is of twice the magnitude of signal 110 inasmuch as it is attenuated by one fewer T-section. The output signal 73′–3 of Fig. 6 is attenuated to ¼ of its initial value and appears across resistor 88 as the signal generally designated 112 in Fig. 7. Signal 112 is twice the magnitude of signal 111 and four times the magnitude of signal 110.

These three signals, 110, 111 and 112 are added across resistor 88, and the resulting signal, generally designated 114 of Fig. 7, appearing across resistor 88 is of a stepped configuration. As will be observed, signal 114 contains eight successively decreasing voltage levels of steps.

With switch 91 closed, signal 114 is amplified by amplifier 93 and the amplified signal, upon application to the vertical deflection plates of storage tube 92, deflects electron beam 96 in a stop and jump fashion across the surface of target electrode 97 to produce a line of spots thereon, each of the spots being formed by a step of the signal 114. By additional apparatus, not illustrated, each of the spots may be charged, upon its formation, to either of two potential levels, the two levels representing the two binary digit values, respectively.

In order to produce more than a single line of spots, normally-open switch 89 is closed and the output signal of gate circuit 85–2 applied to stepped waveform signal generator 90. As has been stated previously, signal generator 90 may be similar either to circuit 8 functioning as a stepped waveform signal generator or the signal generator shown and described in the previously referred to application for patent, Serial No. 241,997, now Patent No. 2,709,770 of Siegfried Hansen. If generator 90 is similar to circuit 8, with only the first three stages utilized, then the output signal of gate 85–2 would be applied to an input conductor of the first flip-flop unit of generator 90 corresponding to input conductor 25–1 of circuit 8. The pulses of negative pulse source 42 would be applied to a counting bus, similar to bus 55 of circuit 8, while the generator output signal would appear across a terminating resistor similar to resistor 88 of circuit 8. If, however, waveform generator 90 is similar to the generator of the patent application, Serial No. 241,997, then the output signal of circuit 85–2 would be applied to the input terminal of the first flip-flop of the series of flip-flops illustrated in block 40 of Fig. 2 of that application.

The output signal, generally designated 115 of Fig. 7, of signal generator 90, is amplified by amplifier 90*a* and the amplified signal is applied to the horizontal deflection plates of storage tube 92. Signal 115 contains a first step 115*a* equal in time duration to one complete cycle of steps of signal 114, and contains seven additional steps, not illustrated, in a complete cycle. Each step of signal 115 produces a single line of spots by electron beam 96 on target electrode 97, and the eight steps per cycle of signal 115 produce eight lines of spots on electrode 97. This is illustrated in Fig. 8 by the pattern 116 of spots on target electrode 97. The total number of spots of pattern 116 will, therefore, be 8×8 or 64. If circuit 8 and generator 90 have a total of *n*-sections or units, then the total number of spots produced in pattern 116 will be $2^n$.

The action of clamping busses 80 and 81 produces equal incremental steps within signal 114 with the resulting even spacings between spots of a given line on target electrode 97. Voltage $E_2$, applied to bus 81, is maintained constant by a well-regulated power supply (not shown) and is slightly less in value than the high voltage levels of the various flip-flop units. The diode connected from each flip-flop unit to bus 81 conducts only when its respective flip-flop unit is producing the high voltage level and acts, thereby, to clamp the high voltage level of its flip-flop at the voltage $E_2$. Voltage $E_1$, maintained constant by a well-regulated power supply (not shown), is slightly higher than the low voltage levels produced by the various flip-flop units. The diode connected from each flip-flop unit to bus 80 conducts only when its corresponding flip-flop unit is producing the low voltage level to thereby maintain the low voltage level at the voltage $E_1$.

A stepped output signal, similar to signal 114 of Fig. 7, may be obtained in which the steps, during a cycle, successively increase, rather than decrease, in magnitude. This is accomplished by connecting the leg resistor of each of the T-sections to the other output conductor of its corresponding flip-flop unit so that circuit 8 functions as a count up counter in the manner noted previously. Thus, resistors 68–1, 68–2 . . ., 68–*n* would be connected to output conductors 38–1, 38–2 . . ., 38–*n*, respectively.

The next function to be described for circuit 8 is that of a parallel-set register in which all of the binary digits of a binary number are simultaneously shifted in parallel relationship with each other into the series of flip-flop units. Thus, each binary digit signal is shifted individually into a corresponding flip-flop unit and is, in turn, represented by the output voltage level produced thereby. In utilizing circuit 8 as a parallel-set register, switch 46 is thrown to its down position so that the negative pulses from source 42 are applied through addressing gate circuit 44 to addressing bus 56. Then, assuming that the output voltage levels produced by switching and counting units 60–1, 60–2 . . ., 60–*n*, represent the units, twos, fours . . . $2^n$'s place digits, respectively, of the binary number to be shifted into circuit 8, those switches of parallel-set switches 62–1, 62–2 . . ., 62–*n* are closed which correspond to the place digits of the binary number having the value 1. Switch 64 is closed with the result that the negative potential from source 65 is applied to those flip-flop units having their corresponding parallel set switches closed. This negative potential is effective to override any pulses appearing on bus 56 during the interval the parallel-set switches are closed and trigger those flip-flop units to which it is applied into producing the high voltage level on their output conductors connected to the ladder network. The remaining flip-flop units are triggered in accordance with the pulses received from counting bus 55, and accordingly, produce the low voltage level on their output conductors connected to the ladder network. A more detailed explanation of this function is set forth in conjunction with the description of circuit 8 functioning as a digital-to-analog converter. The switching circuitry herein illustrated for producing the parallel-set register functioning of circuit 8 is only, by way of example, as will be appreciated by those skilled in the art. In the actual incorporation of circuit 8 into a computer, appropriate gating means and signals appearing elsewhere in the computer would, in all probability, be utilized.

The final function to be described for circuit 8 is that of a digital-to-analog converter, the conversion being performed after the consecutive digits of the number to be converted appear on the consecutive output conductors 39–1, 39–2, etc. The conversion transforms the binary number into an equivalent analog potential, the magnitude of the analog potential being proportional to the magnitude of the binary number. Circuit 8 operating as a digital-to-analog converter is similar to the operation of the converter disclosed in the copending United States application for patent, Serial No. 239,077, now Patent No. 2,718,634, filed July 28, 1951, for "Digital-to-Analog Converter" by Siegfried Hansen.

The binary numbers to be converted may be placed in circuit 8 by either shifting in serially the signals representing the digits of the number with circuit 8 functioning as a shifting register, or by the parallel-set method. After the digits of the binary number are represented by the voltage levels produced by the flip-flop units, the magnitude of the output potential appearing across resistor 88 represents the binary number.

Figure 9:
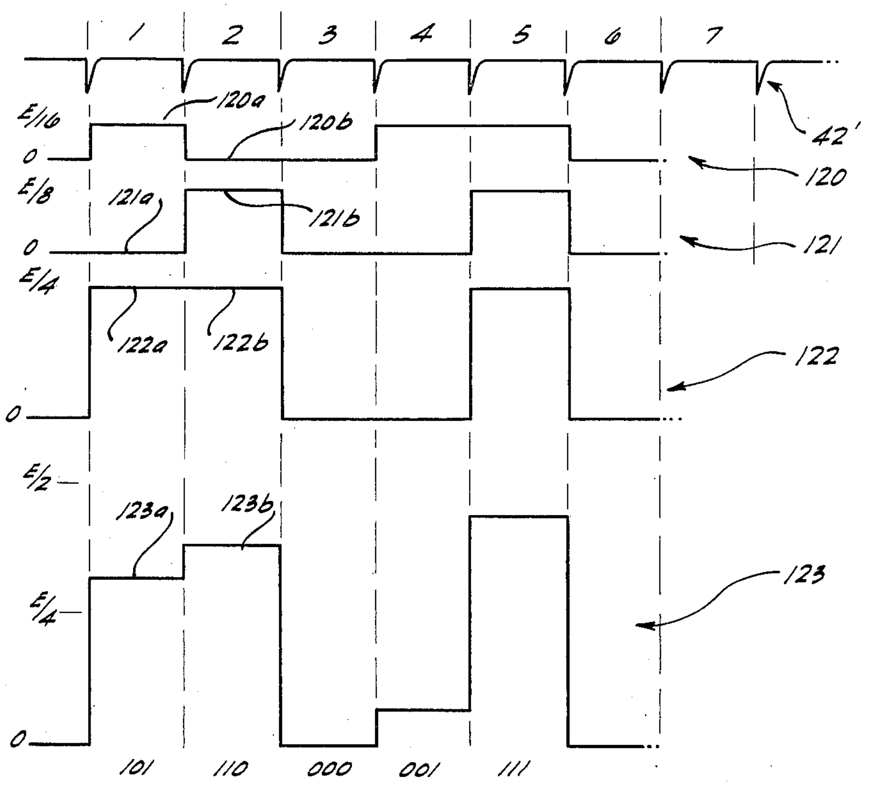

The mode of operation of circuit 8 of Fig. 2 as a digital-to-analog converter in which, by way of example, the binary number is placed in circuit 8 by the parallel-set method may be more readily understood by referring to the composite diagram of signal waveforms appearing at different points in the circuit 8 as illustrated in Fig. 9. In this example, for the purpose of clarity, only the first three units of circuit 8 are employed and it is assumed that resistor 88 is connected between ground and arm resistor 71–3 of T-section 69–3. The first analog conversion desired is that of the binary number 101. Hence, switches 62–1 and 62–3 are closed with switch 64 being likewise closed during the appearance of the first pulse of signal 42'. Flip-flop units 9–1 and 9–3 are thereby triggered by the negative potential of battery 65 through the previously mentioned overriding effect into producing their high voltage levels on output conductors 39–1 and 39–3, respectively. Flip-flop unit 9–2, on the other hand, is triggered by the first pulse of signal 42' into producing its low voltage level on output conductor 39–2.

The signal appearing across resistor 88, generally designated 120 in Fig. 9, is due solely to the output signal of flip-flop unit 9–1, applied to the ladder network and includes the first high voltage level **120*a*. If the voltage differential between the high and low voltage levels, as clamped, of the flip-flop units is designated by E, then the magnitude of level 120*a*** is $$\frac{E}{16}$$

as may be readily calculated using the ladder network parameters previously cited. The signal, generally designated 122 in Fig. 9, appearing across resistor 88, is due solely to the output signal of flip-flop unit 9–3 applied to the ladder network and includes a first high voltage level **122*a***, having a magnitude of $$\frac{E}{4}$$

or four times that of level **120*a*. The signal, generally designated 121 in Fig. 9, appearing across resistor 88, is due solely to the application of the output voltage of flip-flop unit 9–2 to the ladder network from output conductor 39–2, and includes a low voltage level 121*a*** during this first interpulse interval.

The three voltage levels **120*a*, 121*a* and 122*a* are added by resistor 88 and the signal across resistor 88, generally designated 123 in Fig. 9, contains a first level 123*a* of $\frac{5}{16}$E in magnitude, $\frac{5}{16}$E being equal to the summation of voltage levels 120*a*, 121*a* and 122*a***. This magnitude, in turn, corresponds to the binary number 101.

During the second interpulse interval, the conversion of the binary number 110 is obtained by closing switches 61–2 and 61–3 during the second interpulse interval and then closing switch 64 as the second pulse of signal 42 is applied. Accordingly, low voltage level **120*b* of signal 120 is produced by flip-flop unit 9–1 and high voltage levels 121*b* and 122*b* of signals 121 and 122, respectively, are produced by flip-flop units 9–2 and 9–3, respectively. The resulting analog potential, level 123*b* of signal 123** of $\frac{3}{8}$E magnitude represents the binary number 110. In the same manner as described above, the analog conversion of the remaining binary digits illustrated in Fig. 9 may be readily understood.

Other uses, similar to those described, immediately suggest themselves for the electronic switching and counting circuit according to Fig. 2. For example, any given spot of spot pattern 116 on target electrode 97 may be readily contacted by electron beam 96. This may be accomplished, since each spot was originally produced by a given step in signal 114 in conjunction with a given step in signal 115, both illustrated in Fig. 7. Any given step of either signal 114 or 115 may be considered as being initially formed by a binary number represented by the output voltage levels of the various flip-flop units of circuit 8 or generator 90, respectively. Thus, if it desired to contact a given spot by beam 96, it is necessary, after closing switch 91, switch 87 remaining open, to place in unit 8 the same binary number which was present when the given step in signal 114 was originally produced and place in generator 90 the same binary number which was present when the given step of signal 115 was originally produced. With this accomplished, electron beam 96 will be deflected by the vertical and horizontal deflection plates to the given line and spot and an auxiliary computer apparatus (not shown) may either sample the charge on the spot, thus contacted, erase the charge on the spot, or write a new charge thereon.

Another use for the device according to Fig. 2 is that a group of binary digits may be shifted serially into circuit 8, circuit 8 functioning as a shifting register with switch 46 thrown to its down or address position. Then switch 46 may be thrown to its up position, and the circuit initiate counting down in the manner previously described. The counting will thus start from the binary number shifted into the register. This particular operation is often necessary in digital computer operations.

What is claimed as new is:

1. A device for either counting the number of pulses of a first signal or sequentially shifting in and storing at least two voltage levels of a second signal representing two binary digits, respectively, of a binary number, each of said two voltage levels being either of a relatively high or a relatively low voltage level to represent first and second binary digit values, respectively, the duration of each of the voltage levels corresponding to the time interval between a pair of consecutive pulses of a third signal, said device comprising: at least first and second consecutive flip-flop units, each of said units having first, second and third input terminals and first and second output terminals and producing simultaneously first and second voltage levels on said first and second output terminals, respectively, corresponding to the relatively high and low voltage levels of the second signal, respectively, each of said units being responsive to a signal applied to the first input terminal for reversing the voltage levels produced on said output terminals and responsive to a signal applied to said second input terminal for producing the second voltage level on one of said output terminals and responsive to signals applied simultaneously to said second and third input terminals for producing the first voltage level on said one output terminal; first and second conductive means; first selectively operable means for applying the third signal to said first conductive means; second selectively operable means for applying the first signal to said second conductive means; actuating means for actuating either of said first or said second selectively actuable means; a first normally-closed gating circuit coupled between said first conductive means and the third input terminal of said first flip-flop unit, said first gating circuit opening in response to the application thereto of the relatively high voltage level of the second signal; means conductively coupling said first conductive means to the second input terminal of said first and second flip-flop units; a second normally-closed gating circuit coupled between said first conductive means and the third input terminal of said second flip-flop unit, said second gating circuit opening in response to application thereto of the first voltage level produced on said one output terminal of said first flip-flop unit whereby the voltage levels of the second signal are sequentially shifted in and stored by said first and second flip-flop units as corresponding voltage levels appearing on said one output terminal when said first selectively operable means is actuated by said actuating means; means for conductively coupling said second conductive means to the first input terminal of said first flip-flop unit; a third normally-closed gating circuit coupled between said second conductive means and the first input terminal of said second flip-flop unit, said third gating circuit opening in response to application thereto of the first voltage level produced on the other output terminal of said first flip-flop unit whereby the voltage levels appearing on said one output terminals of said first and second flip-flop units represent the units and twos place digits, respectively, of the binary number count of the pulses of the first input signal when said second selectively operable means is actuated by said actuating means.

2. The device of claim 1 including, in addition: a ladder network comprising at least first and second interconnected attenuation sections, each of said sections having an input terminal and said second section having, in addition, an output terminal, the signal appearing on said output terminal being the attenuated summation of the signals applied to the input terminals of said attenuation sections; and means conductively coupling said one output conductor of said first and second flip-flop units to the input terminals of said first and second attenuation sections, respectively, whereby the signal appearing on the output terminal of said network is of stepped waveform when said first selectively-operable means is actuated by said actuating means or the magnitude of the signal appearing on the output terminal of said network is equivalent to the binary number represented by the voltage levels appearing on said one output terminals when said second selectively-operable means is actuated by said actuating means.

3. The device of claim 2 wherein said device, in addition, may store at least first and second binary digits of a binary number in the form of voltage levels appearing on said one output terminals of said first and second flip-flop units, respectively, when said first selectively-operable means is actuated by said actuating means, said device including, in addition, means for rendering inoperable said first and second normally-closed gating means, and means for applying to the third input terminals of said first and second flip-flop units signals corresponding to the binary digits of the binary number having said first binary digit value simultaneously with the appearance of at least one pulse of the third signal on said first conductive means whereby each of said flip-flop units produces a voltage level on its said one output terminal representing the binary digit value to be stored thereby, the magnitude of the signal appearing on the output terminal of said ladder network being equivalent to the magnitude of the stored binary number.

4. The device of claim 3 including, in addition, means conductively coupled to the input terminals of said attenuation sections for maintaining all of the first voltage levels applied thereto at an identical value and all of the second voltage levels applied thereto at an identical value whereby equal voltage differences are maintained between adjacent steps of the stepped waveform presented at said output terminal of said ladder network when said device is actuated to count the pulses of the first signal.

5. A device for either counting the number of pulses of a first signal or sequentially shifting in and storing a series of first and second voltage levels of a second signal representing a series of binary digits, respectively, the duration of each of the voltage levels corresponding to the time interval between a pair of consecutive pulses of a third signal, said device comprising: 1st, 2nd, . . ., $n$th flip-flop units, each of said units having first, second and third input terminals and first and second output terminals, and producing simultaneously high and low voltage levels on said output terminals corresponding to the first and second voltage levels of the second signal, respectively, each of said units being responsive to a signal applied to said first input terminal for reversing the voltage levels produced on said output terminals and responsive to a signal applied to said second input terminal for producing the low voltage level on said first output terminal and responsive to signals applied simultaneously to said second and third input terminals for producing the high voltage level on said first output terminal; first and second conductive means; first selectively-actuable means for applying the third signal to said first conductive means; second selectively-actuable means for applying the first signal to said second conductive means; actuating means for selectively actuating said first and second selectively actuable means; means coupling the second input terminals of said 1st, 2nd, . . ., $n$th flip-flop units to said first conductive means; a first normally-closed gating means coupled between said first conductive means and the third input terminal of said 1st flip-flop unit, said first gating means opening in response to the application thereto of the first voltage level of the second signal whereby said 1st flip-flop unit produces successive high and low voltage levels on its first output terminal corresponding to the successive voltage levels of the second signal when said first selectively-actuable means is actuated by said actuating means; 1st, 2nd, . . ., $(n-1)$th second normally-closed gating means coupled between said first conductive means and the third input terminal of said 2nd, 3rd, . . ., $n$th flip-flop units, respectively, said 1st, 2nd, . . ., $(n-1)$th record gating means opening in response to the high voltage level produced on the first output terminal of said 1st, 2nd . . ., $(n-1)$th flip-flop units, respectively, whereby the successive voltage levels appearing on the first output terminal of said 1st flip-flop unit are sequentially shifted down the remaining flip-flop units and stored as the output voltage levels thereof when said first selectively-actuable means is actuated by said actuating means; means conductively coupling the first input terminal of said 1st flip-flop unit to said second conductive means; a third normally-closed gating means coupled between said second conductive means and the first input conductor of said 2nd flip-flop unit, said third gating means opening in response to application thereto of the high voltage level produced on the second output terminal of said first flip-flop units; and 1st, 2nd, . . ., $(n-2)$th fourth normally-closed gating means coupled between said second conductive means and the first input conductor of said 3rd, 4th, . . ., $n$th flip-flop units, respectively, each of said fourth gating means opening in response to the high voltage level produced simultaneously on the second output terminal of each of the preceding flip-flop units whereby the voltage levels appearing on the first output terminals of said 1st, 2nd, . . ., $n$th flip-flop units represent the units, twos, . . ., $2^n$'s place digits, respectively, of the binary number count of the pulses of the first signal when said second selectively-actuable means is actuated by said actuating means.

6. The device of claim 5 including, in addition, a ladder network comprising 1st, 2nd, . . ., $n$th serially connected attenuation sections, each of said sections having an input terminal and said $n$th section having, in addition, an output terminal, the signal appearing on said output terminal being the attenuated summation of the signals applied to the input terminals of said ladder network; and means conductively coupling the first output terminal of each of said 1st, 2nd, . . ., $n$th flip-flop units to the input terminal of each of said 1st, 2nd, . . ., $n$th attenuation sections, respectively, whereby the signal appearing on the output terminal of said network is of stepped waveform when said first selectively-actuable means is actuated by said actuating means, or the magnitude of the signal appearing on the output terminal of said network is the analog equivalent of the binary number represented by the voltage levels appearing on said first output terminals when said second selectively-actuable means is actuated by said actuating means.

7. The device of claim 6 wherein said device, in addition, may store 1st, 2nd, . . ., $n$th binary digits of a binary number in the form of voltage levels appearing on the first output terminals of said 1st, 2nd, . . ., $n$th flip-flop units, respectively, when said first selectively-actuable means is actuated by said actuating means, the high and low voltage levels representing first and second binary digit values, respectively, said device including, in addition, means for rendering inoperable said first normally-closed gating means and said 1st, 2nd, . . ., $(n-1)$ second normally-closed gating means, and means for applying to the third input terminals of said 1st, 2nd, . . ., $n$th flip-flop units signals corresponding to the binary digits of the binary number having said first binary digit value simultaneously with the appearance of at least one pulse of the third signal whereby each of said flip-flop units produces a voltage level on its first output terminal representing the binary digit value to be stored thereby, the magnitude of the signal appearing on the output terminal of said ladder network being equivalent to the magnitude of the stored binary number.

8. The device of claim 7 including, in addition, electronic clamping means conductively coupled to the input terminals of said attenuation sections for maintaining all of the high voltage levels applied thereto at an identical value and all of the low voltage levels applied thereto at an identical value whereby equal voltage differences are maintained between adjacent steps of the stepped waveform appearing at said output terminal of said attenuator network when said device counts the pulses of the first signal.

9. A device for simultaneously counting the number of pulses in an input signal and producing a stepped waveform output signal, each of the steps of said output signal being produced in response to a pulse of the input signal, said device comprising: a series of bistable flip-flops, each of said flip-flops having an input terminal and first and second output terminals and being responsive to successive pulses applied to said input terminal for producing alternate high and low voltage levels on said first output terminal and complementary low and high voltage levels on said second output terminal, the high and low voltage levels levels representing first and second binary digit values, respectively; means for applying the input signal to the input terminal of the first flip-flop of said series to reverse the voltage level appearing on each of the output terminals of said first flip-flop in response to each pulse of the input signal; gating means operable to apply the input signal to the input terminal of the second flip-flop of said series in response to the high voltage level appearing on one of the output terminals of said first flip-flop for reversing the voltage level appearing on each of the output terminals of said second flip-flop in response to every other pulse of the input signal; a plurality of gating circuits, one for each of the remaining flip-flops of said series, each of said gating circuits being operable to apply the input signal to the input terminals of the associated flip-flop in response to the high voltage level appearing simultaneously on the one output terminal of each of the preceding flip-flops of said series for reversing the voltage level appearing on the first output terminal of each one of said remaining flip-flops in response to every $2n$ pulse of the input signal, where $(n-1)$ is the number of flip-flops of said series preceding said one remaining flip-flop; a ladder network having a series of serially-connected attenuation sections, one for each of said flip-flops, each of said sections having an input terminal and said $n$th section having, in addition, an output circuit, the output signal appearing across said output circuit being the sum of the signals applied to the input terminals of said attenuation sections after attenuation thereof by said network; and means conductively coupling the first output terminal of each of the flip-flops of said series to the input terminal of its corresponding attenuation section whereby the output signal appearing across said output circuit is of a stepped waveform.

10. The device of claim 9 having, in addition, electronic clamping means conductively coupled to the input terminals of said attenuation sections for maintaining all of the high voltage levels applied thereto at an identical value and all of the low voltage levels applied thereto at an identical value whereby equal voltage differences are maintained between adjacent steps of the stepped waveform output signal.

11. A shifting register device for sequentially shifting in and storing successive voltage levels of a first signal representing the successive place digits of a binary number, respectively, each of said voltage levels being either of a first or second value to represent a first or second binary digit value, respectively, the duration of each voltage level corresponding to the time interval between consecutive pulses of a second signal, said device comprising: a series of flip-flop units, each of said units having first and second input terminals and being responsive to a signal applied to said first input terminal for producing a first output voltage level and to signals applied simultaneously to said first and second input terminals for producing a second output voltage level; means for continually applying the second signal to the first input terminal of each of said units; a first gate circuit operable to apply the second signal to the second input terminal of the first flip-flop unit of said series in response to the second voltage level value of the first signal; and a series of second gate circuits, one for each of the remaining flip-flop units of said series, each of said second gate circuits being operable to apply the second signal to the second input terminal of the associated flip-flop unit in response to the second voltage level produced by the flip-flop unit immediately preceding said associated flip-flop unit whereby the successive levels of the first signal are sequentially shifted down the flip-flop units of said series and are stored in the form of corresponding voltage levels produced thereby.

12. The device defined in claim 11 having, in addition, a plurality of attenuation sections, one for each flip-flop unit of said series, said attenuation sections having a common output circuit, each of said sections including an input terminal and having a different attenuation factor, the signal appearing across said common output circuit being the summation of signals applied to the input terminals after attenuation thereof by said sections; and means for applying the output voltage produced by each flip-flop unit to the input terminal of the corresponding attenuation section whereby the magnitude of the signal appearing across said common output circuit is equivalent to the magnitude of the binary number stored by the device.

13. A device for sequentially shifting in and storing a series of high and low voltage levels of a first signal representing a series of binary digits, respectively, of a binary number and producing an analog potential equivalent to the binary number thus stored, the duration of each of the voltage levels corresponding to the time interval between a pair of consecutive pulses of a second signal, said device comprising: a series of flip-flop units, each of said units having first and second input terminals and an output terminal and being responsive to a pulse applied to said first input terminal for producing a first voltage level on said output terminal and to pulses applied simultaneously to said first and second input terminals for producing a second voltage level on said output terminal; means for applying the second signal to the first input terminal of each of said series of flip-flop units; first gating means operable to apply the second signal to the second input terminal of the first flip-flop of said series in response to the high voltage level of the first signal whereby said first flip-flop unit produces a series of first and second voltage levels corresponding to the high and low voltage levels, respectively, of the first signal; a series of second gating means, one for each of the remaining flip-flop units of said series, each of said second gating means being operable to apply the second signal to the second input terminal of the associated flip-flop unit in response to the first voltage level appearing on the output terminal of the flip-flop unit immediately preceding said associated flip-flop unit whereby said series of first and second voltage levels produced by said first flip-flop unit are sequentially shifted down and stored by said remaining flip-flop units and appear as corresponding voltage levels produced on the output terminals, respectively, thereof; a ladder network comprising a series of attenuation sections, one for each flip-flop unit of said series, each of said attenuation sections having an input terminal and a different attenuation factor, said series of attenuation sections having a common output circuit, the output signal appearing across said output circuit being the sum of the signals applied to the input terminals of said sections after attenuation thereof by said network; and means conductively coupling the output terminal of each flip-flop unit to the input terminal of the associated attenuation section whereby the magnitude of the signal appearing across said common output circuit is equivalent to the magnitude of the binary number represented by the voltage levels appearing on the output terminals of the flip-flop units of said series.

14. The device of claim 13 wherein said device, in addition, may store a series of binary digits of another binary number as the voltage levels appearing on the output terminals of said series of flip-flop units, respectively, the first and second voltage levels representing first and second binary digit values, respectively, said device including, in addition, means for rendering inoperative said first gating means and said series of second gating means, and means operable during the appearance of at least one pulse of the second signal for applying a signal to the second input terminal of each of the flip-flop units corresponding to the binary digits of the other binary number having the second binary digit value to produce on the second output terminals of said series of flip-flop units voltage levels representing the series of binary digits of the other binary number, respectively, the magnitude of the signal appearing on the output terminal of said ladder network being equivalent to the magnitude of the other binary number.

15. A device for either counting the number of pulses of a first signal or storing a series of binary digits of a binary number as a series of voltage levels, said device comprising: a series of flip-flop units corresponding to the series of binary digits of the binary number to be stored, each of said units having first, second and third input terminals and first and second output terminals, and producing simultaneous high and low voltage levels on said output terminals, respectively, said high and low voltage levels representing first and second binary digit values, respectively, each of said units being responsive to a signal applied to the first input terminal for reversing the voltage levels produced on said output terminals and responsive to a signal applied to said second input terminal for producing the low voltage level on said first output terminal and responsive to signals applied simultaneously to said second and third input terminals for producing the high voltage level on said first output terminal; conductive means; first selectively-operable means for applying the first signal to said conductive means; means conductively coupling the first input terminal of the first flip-flop unit of said series to said conductive means; a series of normally-closed gating means, one for each of the remaining flip-flop units of said series, each of said gating means being conductively coupled between said conductive means and the first input terminal of the associated flip-flop unit, each of said gating means opening in response to the high voltage level being produced simultaneously on the second output terminal of each of the flip-flop units immediately preceding the associated flip-flop unit to produce on the first output terminal of said associated flip-flop unit a voltage level representing one place digit of the binary number count of the pulses of the first signal when said first selectively-operable means is operated; second selectively-operable means for applying a second signal to the second input terminal of each of said flip-flop units; and means for selectively applying said second signal to the third input terminal of each of the flip-flop units corresponding to the binary digits of the binary number having said first binary digit value to produce on the first output terminal of each of said flip-flop units a voltage level representing the digit value of the corresponding digit of the stored binary number when said second selectively-operable means is operated.

16. The device of claim 15 including, in addition, a series of attenuation sections, one for each flip-flop unit of said series, said attenuation sections having a common output circuit, each of said attenuation sections including an input terminal and having a different attenuation factor, the signal appearing across said common output circuit being the summation of signals applied to the input terminals after attenuation thereof by said sections; and means conductively coupling the first output terminal of each of said flip-flop units to the input terminal of the corresponding attenuation section whereby the signal appearing across said common output circuit is a stepped waveform when said first selectively-operable means is operated and the magnitude of the signal appearing across said common output circuit is equivalent to the magnitude of the stored binary number when said second selectively-operable means is operated.

17. In a selectively operable electronic counting and shifting device for either counting the number of pulses of a first signal or sequentially shifting in and storing two voltage levels of a second signal, the duration of each of the voltage levels corresponding to the time interval between a pair of consecutive pulses of a third signal, the combination comprising: first and second flip-flop units, each of said units having first, second and third input terminals and being operable in a first state of conduction upon application of a pulse to said first input terminal and in a second state of conduction in response to pulses applied simultaneously to said first and second input terminals, the state of conduction of each of said flip-flop units being reversible in response to a pulse applied to said third input terminal; first gating means coupled between said units and having an input terminal, said first gating means being responsive to one of said first and second states of conduction of said first unit for applying pulses appearing at its input terminal to the third input terminal of said second unit; selectively-actuable counting means for applying the pulses of the first signal to the input terminal of said first gating means and simultaneously to the third input terminal of said first unit; second gating means coupled between said units and having an input terminal, said second gating means being responsive to the other of said states of conduction of said first unit for applying pulses appearing at its input terminal to the second input terminal of said second unit; third gating means having an input terminal, and responsive to one of the two levels of the second signal for applying pulses appearing at its input terminal to the second input terminal of said first unit; selectively-actuable shifting means for simultaneously applying the pulses of said third signal to the first input terminal of each of said units and to the input terminal of each of said second and third gating means; and means for selectively actuating said counting means and said shifting means.

18. In an electronic device for sequentially shifting in and storing two voltage levels of a first signal, the duration of each of the voltage levels corresponding to the time interval between a pair of consecutive pulses of a second signal, the combination comprising: first and second flip-flop units, each of said units having first and second input terminals and being operable in a first state of conduction upon application of a pulse to said first input terminal and in a second state of conduction in response to pulses applied simultaneously to said first and second input terminals; first gating means coupled between said units and having an input terminal, said first gating means being responsive to one of the states of conduction of said first unit for applying pulses appearing at its input terminal to the second input terminal of said second unit; second gating means having an input terminal and responsive to one of the two voltage levels of the first signal for applying pulses apeparing at its input terminal to the second input terminal of said first unit; and means for simultaneously applying the pulses of the second signal continually to the input terminal of each of said first and second gating means and to said first terminal of each of said first and second flip-flops.

19. An electronic binary counter for counting the number of electrical input pulses generated by a source of pulses, said counter comprising: at least first, second and third flip-flops, each having an input terminal and an output terminal; a first gate circuit including an output terminal connected to the input terminal of said second flip-flop, said gate circuit being operable in response to a high level voltage presented at the output terminal of said first flip-flop for passing an applied pulse to trigger said second flip-flop; a second gate circuit connected to the input terminal of said third flip-flop, said second gate circuit being operable in response to high level voltages at the output terminals of said second flip-flop and said first gate circuit for passing an applied pulse to trigger said third flip-flop; and means for applying the input pulses to the input terminal of said first flip-flop and to said first and second gate circuits.

20. An electronic binary counter for counting the number of electrical input pulses generated by a source of pulses, said counter comprising; at least first, second and third flip-flops, each having an input terminal and an output terminal; a first gate circuit, including first and second input terminals, and having an output terminal connected to the input terminal of said second flip-flop; a second gate circuit including first, second and third input terminals and an output terminal connected to the input terminal of said third flip-flop; and means for applying the input pulses to the input terminal of said first flip-flop and to the first input terminals of said first and second gate circuits, said first gate circuit being responsive to a high level voltage applied to its second input terminal from the output terminal of said first flip-flop for passing the input pulse to trigger said second flip-flop, said second gate circuit being responsive to high level voltages applied to said second and third input terminals from the output treminals of said second flip-flop and said first gate circuit, respectively, for passing the applied input pulse to trigger said third flip-flop.

References Cited in the file of this patent

UNITED STATES PATENTS

| | | |
|---|---|---|
| 2,591,931 | Grosdoff | Apr. 8, 1952 |
| 2,600,193 | Bell | June 10, 1952 |
| 2,601,491 | Baker | June 24, 1952 |
| 2,637,812 | Hagen | May 5, 1953 |

FOREIGN PATENTS

| | | |
|---|---|---|
| 975,941 | France | Oct. 17, 1950 |
| 994,531 | France | Aug. 8, 1951 |

OTHER REFERENCES

Electrical Engineering, "The Binary Quantizer" by Barney, pages 962 to 967, November 1949.

"Theory and Techniques in the Design of an Electronic Digital Computer," Moore School of Engineering, University of Pennsylvania, volume 111, Lecture 33 (34 pages of specification, 10 sheets of drawings), August 6, 1946.

Electronic Engineering, "An Electronic Digital Computer," by A. D. Booth, pages 492 to 498, December 1950.